(Model.)
W. L. GERARD.
Tether.
No. 229,691.
Patented July 6, 1880.
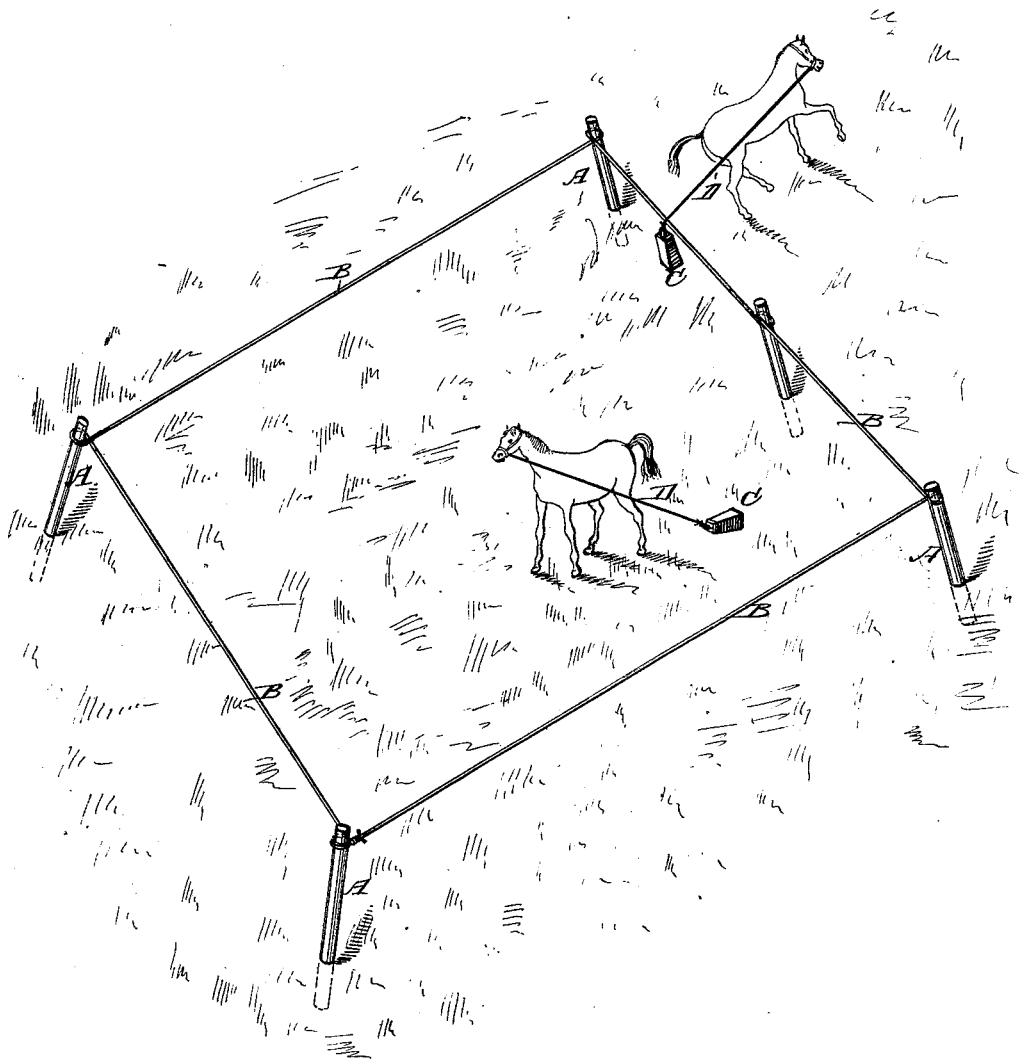
WITNESSES:
Francis McArdle.
C. Sedgwick
INVENTOR:
W. L. Gerard
BY Munn & Co
ATTORNEYS.

UNITED STATES PATENT OFFICE.

WILLIAM L. GERARD, OF JUNCTION CITY, KANSAS.

TETHER.

SPECIFICATION forming part of Letters Patent No. 229,691, dated July 6, 1880.

Application filed May 19, 1880. (Model.)

*To all whom it may concern:*

Be it known that I, WILLIAM L. GERARD, of Junction City, Davis county, Kansas, have invented a new and Improved Tether, of which the following is a specification.

The object of my invention is to provide tether which permits of keeping the animals within a limited space without requiring a long rope or strap or strong and insurmountable fences.

The invention consists in an anchor or like device attached to the halter-strap of the animal, so that if the animal steps over the low fence surrounding its pasture the anchor catches on the top wire of said fence, thus holding the animal and preventing its leaving the pasture.

In the accompanying drawing a field is represented upon which two horses provided with the anchor of my improved tether are pastured, one of the animals being inside and the other outside of the fence surrounding the plot in which they are permitted to graze.

The said fence is made about twelve to eighteen inches high, and simply consists of a number of posts, A, which are driven into the ground so as to be inclined inward, and are connected by a strong wire, rawhide rope, or the like article, B, which is attached to the top of each post A. The posts A are arranged at suitable distances to prevent a slack of the wire B.

An anchor or block, C, is attached to the halter-strap D of the animal, this block being slightly longer than the distance from the ground to the wire B, and of such weight that the animal cannot jerk it over the wire.

The animals, after having been provided with the anchor C, are admitted into the space within the inclosure, care being taken to have the anchor within the inclosure, so that the animal can roam in the same without being molested and troubled by a long rope, which is liable to become entangled and to trip the animal. The animal can step over the wire and move in a direction from the inclosure until the anchor C rests against the wire B. All pulling and tugging will be of no avail, for, as stated above, the anchor is to be of such weight that it cannot be jerked over the fence by the animal; but the animal can walk up and down along the fence-wire on the outside of the inclosure, dragging or pulling along the anchor, which rests against the inner side of the wire B. As the posts A are inclined from the inside of the inclosure, the anchor can pass by said posts without striking them.

The inclosure may be made of any desired size, varying from a few square rods to a number of acres.

The weight of the anchor is to be varied according to the weight, strength, or size of the animal.

Having thus described my invention, I claim as new and desire to secure by Letters Patent—

In a tethering device, the combination, with a suitable rope or halter, D, and block or anchor C, of a wire, B, and inclined posts A, to which the wire is attached, all arranged substantially as and for the purpose set forth.

WILLIAM LUCE GERARD.

Witnesses:
B. ROCKMER,
E. E. BARKER.